Oct. 16, 1928.

E. KERN 1,688,189

RECTIFIER SYSTEM

Filed Aug. 10, 1927

Witness:
R. Burkhardt

Inventor:
Erwin Kern,
By Cromwell, Greist & Warden
Attys

Patented Oct. 16, 1928.

1,688,189

UNITED STATES PATENT OFFICE.

ERWIN KERN, OF WETTINGEN, SWITZERLAND.

RECTIFIER SYSTEM.

Application filed August 10, 1927, Serial No. 211,988, and in Germany July 26, 1926.

This invention relates to rectifier systems and it has among its objects an improved protective arrangement for use in connection with high power rectifiers of the mercury vapor type.

According to the invention rectifier systems of the foregoing character are protected by providing two sets of circuit breaker mechanisms in the direct current connections of the rectifier, one breaker mechanism being of the quick acting type and serving to introduce a current limiting resistance in the circuit, and the other breaker mechanism serving to subsequently completely interrupt the circuit. In the preferred arrangement the operation of the second breaker mechanism is controlled by the action of the first breaker mechanism, for instance, through suitable interlocking contacts thereon.

The invention will be best understood from the accompanying drawings, wherein

Figure 1:
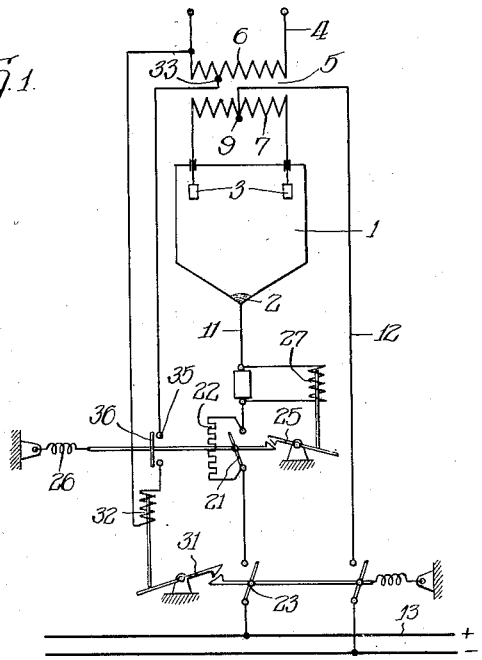
Figure 2:
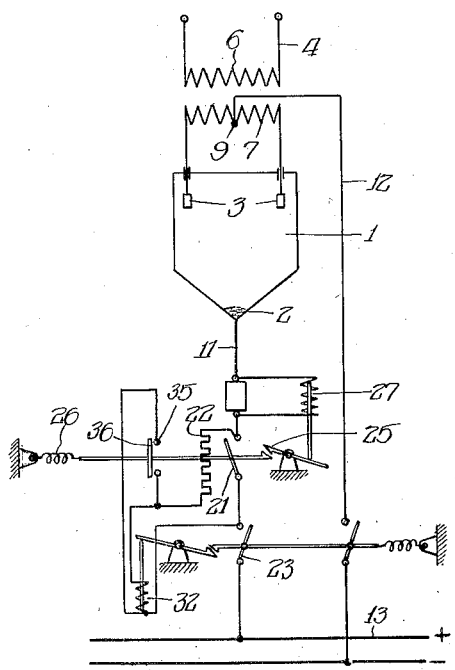
Figure 3:
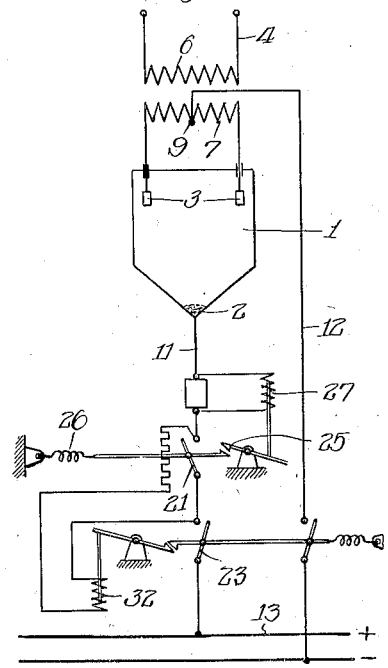

Fig. 1 is a circuit diagram of a rectifier system embodying one form of the invention; and Figs. 2 and 3 are diagrams similar to Fig. 1 embodying other forms of the invention.

In the exemplification shown in Figure 1, a high-power mercury vapor rectifier 1 has a mercury cathode 2 with a pair of anodes 3, the rectifier being of the two-phase type. The rectifier is supplied with alternating current from a supply line 4 by means of a transformer 5, having a primary winding 6 and a secondary winding 7, having its end terminals connected to the anodes 3 of the rectifier. The rectified current is derived from the cathode 2 of the rectifier and from a mid-tap 9 on the secondary transformer winding 7 and supplied by means of direct current leads 11, 12 to a direct current line 13 to which other rectifiers, or generating equipment and consuming devices, may be connected.

One of the serious difficulties met in the installation of high-power rectifiers is backfire occurring occasionally in the interior of the rectifier. Because of the large power capacity of the apparatus operating on the same power line as the rectifier, a back-fire of such nature causes a reverse current flow of great magnitude into the rectifier resulting in damage and very often destruction of the expensive apparatus.

In order to prevent, or at least reduce the damage resulting from such reverse current flow, special high-speed circuit breakers have been provided for controlling the connections between the rectifier and the direct-current power line so that on occurrence of a reverse current flow, by reason of some defect in the rectifier, the connections to the direct-current power line are quickly interrupted and the current to the rectifier cut off.

The cost of the protective equipment in the form of high-speed circuit breakers constitutes a very considerable item of the installation cost of such systems, particularly because of the great current-rupturing capacity which such breakers must have in order to perform their duty of positively disconnecting the rectifier to prevent dangerous current flow thereto.

My invention provides a protective system for rectifier installations of the above described character permitting the utilization of less expensive high-speed circuit breakers in the connections between the rectifiers and the direct-current power line while securing the high degree of protection obtained with a more costly prior-art arrangement.

To this end I provide, in the lead connections between the rectifier 1 and the direct-current line 13, two serially arranged breaker units, namely, a quick-acting breaker unit 21, which on opening merely inserts a current-limiting resistor 22 into the circuit between the rectifier and the direct-current line, and a second breaker unit 23, which on opening completely disconnects the rectifier 1 from said direct-current line. The two circuit breakers 21 and 23 are so arranged that on occurrence of a fault in the rectifier that causes a reverse current flow thereto, the quick-acting circuit breaker 21 opens first to merely limit the amount of current flowing into the circuit breaker, and subsequently the disconnecting circuit breaker 23 is caused to be opened to completely interrupt said current flow. As a result, the duty on the expensive quick-acting circuit breakers is greatly reduced and the contacts and mechanisms thereof are not exposed to the kind of excessive wear that they would be subjected to otherwise. In addition, quick-acting circuit breakers of much smaller rupturing capacity, and consequently cheaper design, may be employed to secure subsequently the same degree of protection for the entire installation.

In order to secure full protection with the above described systems utilizing a quick-acting circuit breaker mechanism for introducing a current-limiting resistor and a second circuit breaker for entirely insulating the rectifier, it is absolutely important to secure proper sequence of operation of the two circuit breakers. In other words, the high rate of protection will be obtained only if the quick-acting circuit breaker opens first and the insulating circuit breaker opens only after the current has been limited by the insertion of the current-limiting resistor into the circuit through the action of the first circuit breaker.

According to the invention, the positive action and sequence of operations of the two circuit breakers is secured by so interlocking the two breaker mechanisms that the second or insulating circuit breaker can open only after the first circuit breaker has opened and the current limited thereby. Figure 1 shows a simple arrangement for effecting such action.

The quick-acting circuit breaker is shown provided with a latch 25 for holding the same in closed position, the switching member having a spring 26 which tends to move the same to the open position. A reverse-current relay device 27 is arranged to be controlled in accordance with the current flow conditions from the rectifier, so that upon occurrence of a reverse current flow the latch 25 is quickly tripped causing the circuit breaker 21 to open quickly so as to introduce the current-limiting resistor 22 in the connection between the cathode 2 of the rectifier and the direct-current line 13. The second circuit breaker 23 is shown diagrammatically comprising a similar latch 31 arranged to be operated by a relay 32 which is energized from an auxiliary tap 33 on the primary transformer 6, the energizing circuit for said relay 32 being controlled by a pair of interlocking contact members 35 co-operating with a suitable contact bar 36 that is actuated by the movement of the circuit breaker 21 from the closed to the open position.

In the specific arrangement shown in the drawing, as long as the circuit breaker 21 is closed, the contact bar 36 short-circuits the interlocking contacts 35 thereby holding the relay 32 energized. As a consequence, the latch member 31 will hold the circuit breaker 23 in closed position. On occurrence of a reverse current flow, resulting in opening of the quick-acting circuit breaker 21, the contact bar 36 will open the energizing circuit for the relay 32 tripping thereby the latch 31 of the insulating circuit breaker. Since the opening of the circuit breaker 23 can be accomplished only after the contact bar 36 has opened the energizing circuit for relay 32, and this in turn will take place only after the quick-acting circuit breaker 21 has opened, positive sequence of the actions of the two circuit breakers is secured and effective protection of the system obtained.

Figure 2 shows a modification of the invention, wherein the actuating coil for the tripping relay 32 of the second circuit breaker is arranged to be energized from the direct current side of the rectifier instead of from the alternating current side thereof. To this end, the coil 32 is shown connected in series with the current-limiting resistor 22 across the terminals of the quick-acting circuit breaker, the two terminals of the relay 32 being connected to the interlocking contacts 35 of the quick-acting circuit breaker so as to be closed by the contact bar 36 when said quick-acting circuit breaker is in closed position. On occurrence of a reverse current flow and tripping of the quick-acting circuit breaker by relay 27, the contact bar opens a short circuit across said relay 32, permitting the current from the current-limiting resistor 22 to pass through the relay to trip the second circuit breaker 23.

Figure 3 shows an arrrangement similar to Figure 2 but somewhat more simplified by dispensing with the contact bar 36 and the interlocking contacts 35. Thus, in the arrangement in Figure 3 the actuating coil of the tripping relay 32 of the second circuit breaker is directly connected in series with the current-limiting resistor 22 without any further control elements. Under normal operating conditions the relay will not be energized since the circuit through the current-limiting resistor 22 is bridged by the quick-acting switch 21. Only when the latter switch opens in response to the occurrence of a reverse current flow, current will flow through the current-limiting resistor 22 and energize the serially-connected tripping relay 32 causing the latter to trip. As a result, tripping and opening of the second insulating circuit breaker will take place only after prior opening of the quick-acting circuit breaker 21.

Various other interlocking and control arrangements and operating circuits therefor will suggest themselves to those skilled in the art for use in accordance with the principles of the invention set forth hereinbefore. It is accordingly desired that the appended claims be given a broad construction commensurate with the scope of the invention within the art.

I claim as my invention:

1. In a rectifier system, a rectifier, direct current leads from said rectifier, a first circuit breaker in said leads, a second circuit breaker in said leads, a tripping mechanism, a tripping coil for said first circuit breaker, a tripping coil for said second circuit breaker, and a resistor bridging said first circuit breaker, the tripping of said second circuit breaker being actuated by the current through said bridging resistor.

2. In a rectifier system, a rectifier, direct current leads from said rectifier, a first circuit breaker in said leads, a second circuit breaker in said leads, a tripping mechanism, a tripping coil for said first circuit breaker, a tripping coil for said second circuit breaker, a resistor bridging said first circuit breaker, the tripping of said second circuit breaker being actuated by the current through said bridging resistor, and means responsive to reverse current flow in said rectifier for actuating said first tripping coil.

3. In a rectifier installation, a rectifier, direct current leads from said rectifier, a first circuit breaker in said leads, a second circuit breaker in said leads, a resistor adapted to be connected in series with said leads between the terminals of said first circuit breaker on opening thereof, means for tripping said first circuit breaker in response to reverse current flow to the said rectifier, and interlocking contacts on said first circuit breaker for controlling tripping of said second circuit breaker to cause opening thereof subsequent to the opening of the first circuit breaker.

In testimony whereof I have hereunto subscribed my name this 20th day of July, A. D., 1927, at Zurich, Switzerland.

ERWIN KERN.